Dec. 4, 1923.
J. C. OSHER
1,476,005
MOTOR
Filed Aug. 28, 1919
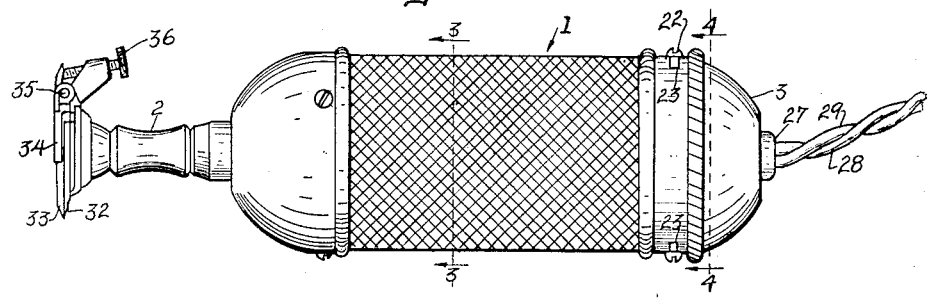
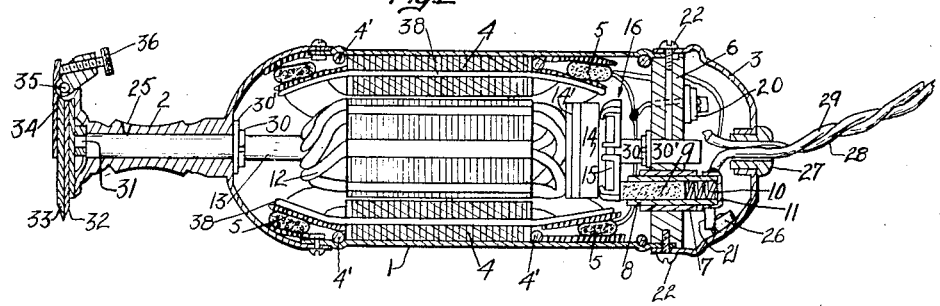
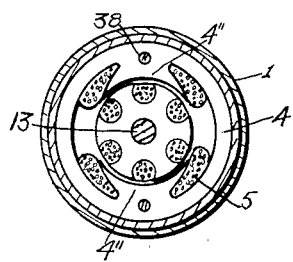
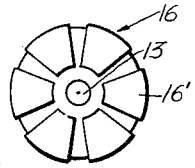
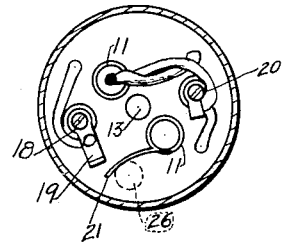
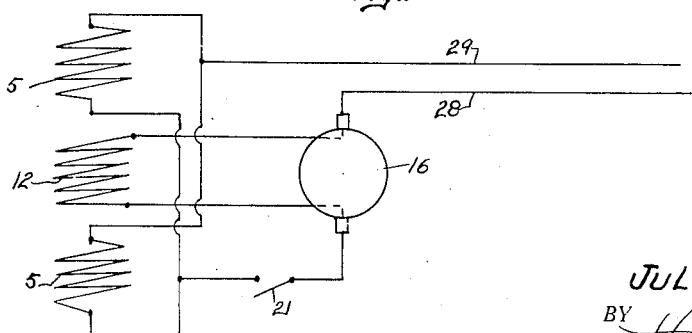
INVENTOR.
JULIUS C. OSHER
BY
ATTORNEYS Patented Dec. 4, 1923.

1,476,005

UNITED STATES PATENT OFFICE.

JULIUS C. OSHER, OF ANAHEIM, CALIFORNIA, ASSIGNOR OF ONE-HALF TO OSCAR WINGARD, OF LOS ANGELES, CALIFORNIA.

MOTOR.

Application filed August 28, 1919. Serial No. 320,530.

*To all whom it may concern:*

Be it known that I, JULIUS C. OSHER, a citizen of the United States, residing at Anaheim, in the county of Orange and State of California, have invented new and useful Improvements in Motors, of which the following is a specification.

The objects of my invention are to provide a motor adapted to be carried in the hand for operating small hand tools such as dental tools, hair clippers and the like, and to make a motor having the several novel features herein shown described and claimed.

With reference to the drawings:

Figure 1 is a side view of the entire device as it would appear carrying a small hair clipper ready for operation.

Figure 2 is an elevation of the device showing in section the fields of the motor and the outer casing.

Figure 3 is an end view of the device taken on line 3—3 Figure 1.

Figure 4 is an end view of the device taken on line 4—4 Figure 1, showing electrical connections.

Figure 5 is a plan of a commutator of the motor.

Figure 6 is a plan of one of the segments of the commutator as it would appear before being attached to the commutator.

Figure 7 is a diagram of the series winding used in the motor.

More specifically 1 indicates the casing of the motor carrying a bearing 2 for a motor shaft extending from one end and a cap 3 covering the other end.

Within the casing is mounted field members 4 having the field windings 5, being held by rings 4' which are fixed to the casing 1.

In the end of the casing opposite to the bearing 2 is a diaphragm 6 in which is formed a second bearing for the motor shaft.

The diaphragm 6 also carries an insulating shell 7 mounted in which are the metallic tubular brush holders 8 carrying motor brushes 9 and tension spring 10.

Slidably fitting over the outer ends of the metallic tubes 8 and positioned in the cap 3 are the caps 11, 11 for connecting the brushes into the electric circuit.

The numeral 12 designates a motor armature having a suitable winding and a shaft 13 rotatably mounted in the bearing 2 and the bearing in the diaphragm 6 and carrying the spring rings 30 and collars 30' which latter bear against said bearing 2 and the bearings in the diaphragm 6.

At one end of the armature is a positively mounted commutator carrier 14 having the flange 15. A metallic plate 14' forms a backing for the commutator carrier 14.

The numeral 16 designates a commutator having triangular shaped segments 16' each segment having ears 17 formed at each angle for attaching the segment to the carrier 14.

Within the cap 3 and on the diaphragm 6 are mounted binding posts 18 and 20, the former being provided with a contact point 19, and said binding post 20 being provided with a switch blade 21.

The cap 3 is rotatably mounted on the shell and is held to certain limits of rotation by the screws 22 which operate in the slots 23 formed in the cap. The cap also carries a lug 26 for engaging the switch blade 21 when the cap is turned and has an insulating plug 27 through which pass current carrying wires 28 and 29 and which latter are connected to the binding posts within the cap.

One of the holes for the screws 22 is drilled into the diaphragm 6 to the shaft bearing at its center thereby forming an oiling chamber for the shaft. Another oil hole 25 is provided in the bearing 2.

The hair clipper mounted upon the shaft at the end of the bearing 2 consists of the eccentric 31 moving cutter blades 32 and stationary blades 33 carried by the plate 34. The plate 34 is pivotally mounted by the hinge 35 and the tension of the stationary blade 33 upon the sliding blade 32 is governed by the thumb screw 36.

In assembling the motor the field member 4 being made up of laminated plates punched to the form shown in Figure 3 is pressed into position in the casing 1 and the rings 4' are soldered to the casing to keep the field from slipping.

The windings 5 having been previously wound upon a form are placed around the inwardly projecting portions 4" of the field member.

The armature carrying a six segment commutator is placed within the field one end of its shaft fitting the bearing 2. In a groove in the shaft is seated the spring ring 30 against which is placed the washer 30' this forming a thrust bearing on the shaft against the inner face of each of the shaft bearings.

The commutator carrier is formed of fibre board turned out with a flange 15 and is secured to the metallic backing 14'. The segments of the commutator are made triangular as shown and in mounting them in place on the face of the flange 15 two of the ears 17 are bent over the edge of the flange and the third ear is bent inwardly into a recess cut outwardly from a central bore.

The ends of the armature windings are connected properly with the commutator segments.

The diaphragm 6 is then pressed into the open end of the casing so that the brushes 9 bear correctly upon the commutator.

The ends of the field windings are brought out through holes in the diaphragm 6 one end being connected with the binding post 18 and the other to one of the power leads. The other power lead is connected with one of the caps 11 fitting over the top of one of the tubular brush holders 8, the other brush holder cap 11 carrying the switch blade 21.

The cap 3 is then placed upon the casing and loosely held by the screws 22. The lug 26 within the cap is so positioned that by turning the cap part of a revolution the lug engages the switch blade 21 and presses it against the contact point 19. Thus a circuit is established through the field and armature windings as shown by the diagram in Fig. 7 in which 28 and 29 are the lead wires, 21 the switch, 5, 5 the field windings, 12 the armature and 16 the commutator.

With the current in the lead wires if the cap 3 is turned clockwise the switch is closed and the motor will rotate and through the eccentric 31 the moving blade 32 of the cutter will reciprocate. To stop the motor the cap is turned contra clockwise.

It is pointed out that in entering field coils that have been previously wound on a form into a field structure such as the one shown some positive means must be employed for holding the coils in place. In the present invention this means consists of the wires 38 passing through holes common to all of the field laminations, there being a hole for each field winding. The ends of the wires are projected far enough beyond the field to carry the removable field windings.

I have shown the preferred forms of carrying out my improvements in a motor for the hand in which lightness, strength and compactness have been the objects aimed at but it is obvious that some variation in the improvements might be made without departing from the spirit of the invention as claimed.

I claim:

1. In an electric motor, a casing, a field arranged therein, which field comprises a plurality of rings that are provided with oppositely disposed inwardly projecting portions, field windings positioned on said inwardly projecting portions with the ends of said windings projecting beyond the ends of the field, wires extending through the rings of the field, the end portions of which wires project beyond the ends of the field and serve as supports for the end portions of the field windings, and means secured to said casing for retaining the field in position therein.

2. In an electric motor, a casing, a field arranged therein, which field comprises a plurality of rings that are provided with oppositely disposed inwardly projecting portions, field windings positioned on said inwardly projecting portions with the ends of said windings projecting beyond the ends of the field, wires extending through the rings of the field, the end portions of which wires project beyond the ends of the field and serve as supports for the end portions of the field windings, means secured to said casing for retaining the field in position therein and an armature arranged for operation within said casing and field.

3. In an electric motor for the hand, in combination, a casing carrying a field member, an armature adapted to rotate within the field member having a shaft, one end of which is rotatably mounted in a bearing in one end of the casing, a commutator for the armature, a diaphragm mounted in the other end of the casing having a second bearing for the armature shaft, insulating sleeves mounted through the diaphragm, tubular brush holders, carrying spring weighted brushes bearing upon the commutator, carried within the sleeves, caps slidably fitting over the outer ends of the tubular brush holders, a spring switch blade fixed to one of the brush holder caps, a contact point connected into the circuit positioned to close the circuit with the switch blade, a cap rotatably mounted over the end of the casing carrying a lug positioned to engage the switch blade so that when the cap is turned one way the lug will press the blade against the contact point and an electric circuit will be established and when the cap is turned the other way the blade will spring away from the contact point and the circuit will be broken, and an insulating plug in the casing cap through which lead wires pass, one lead wire being connected to one end of the field windings through the diaphragm and the other to the other brush holder cap and the other end of the field winding connected through the diaphragm to the binding post carrying the contact point of the switch thus completing an electric circuit when the switch is closed.

4. In combination in an electric motor for the hand, a casing carrying a field member, an armature mounted in bearings in the casing to rotate within the field and having a commutator, a diaphragm fitting into one end of the casing adjacent to the commutator carrying brushes and binding posts, a spring switch mounted on the diaphragm, a cap rotatably fitting over the end of the casing and covering the diaphragm having a lug for engaging the switch so that when the cap is turned one way a part of a revolution the switch is closed and when the cap is turned in the opposite direction the switch is opened.

5. An electric motor comprising a cylindrical casing, a shaft turning in bearings therein, an armature upon the shaft, a commutator block fixed to the shaft and having commutator segments secured to one end face thereof, an insulating block fixed within the casing, a pair of brush holding tubes projecting through said block, brushes within the tubes, and means within the casing for determining the flow of current through the brushes.

6. A motor device having a field magnet comprising a series of independent core laminations, field coils mounted thereon, and common means for securing said coils in operative position and for maintaining said laminations in alignment.

7. In a miniature electric motor, a shell adapted to be held in the hand, a plurality of co-axial metallic members assembled within the shell at right angles to the axis thereof to form laminated field magnets having polar projections, said members having holes that align, insulated windings positioned over said projections and within said assembled members, and a holding bar for each winding passing through the aligned holes of said members and retaining its corresponding winding in assembled position.

8. An electric motor comprising a cylindrical shell, a cap fixed upon one end of the shell, a shaft bearing supported by said cap, an insulating block seated within the opposite end of the shell and having a central journal opening, screws for retaining said block in position, an armature shaft in said bearings, a commutator on the shaft, brushes supported by said insulating block, and a switch element also mounted upon said block.

In testimony whereof I have signed my name to this specification.

JULIUS C. OSHER.